(12) United States Patent
Miura

(10) Patent No.: US 7,273,229 B2
(45) Date of Patent: Sep. 25, 2007

(54) APPARATUS FOR DRIVING ON-VEHICLE OCCUPANT-PROTECTING AIRBAG DEVICE

(75) Inventor: Hisanori Miura, Gamagoori (JP)

(73) Assignee: DENSO Corporation, Kariya (JP)

( * ) Notice: Subject to any disclaimer, the term of this patent is extended or adjusted under 35 U.S.C. 154(b) by 414 days.

(21) Appl. No.: 10/776,205

(22) Filed: Feb. 12, 2004

(65) Prior Publication Data
US 2004/0160045 A1 Aug. 19, 2004

(30) Foreign Application Priority Data
Feb. 14, 2003 (JP) .............................. 2003-37286

(51) Int. Cl.
B60R 21/16 (2006.01)

(52) U.S. Cl. .................... 280/735; 701/45; 701/46; 701/47

(58) Field of Classification Search ............ 280/734, 280/735; 180/271; 701/45, 46, 47
See application file for complete search history.

(56) References Cited

U.S. PATENT DOCUMENTS

| | | | |
|---|---|---|---|
| 5,182,459 A | | 1/1993 | Okano et al. |
| 5,283,472 A | | 2/1994 | Takeuchi et al. |
| 5,351,185 A | * | 9/1994 | Takeuchi et al. ............... 700/79 |
| 5,363,303 A | * | 11/1994 | Kaneko et al. ................ 701/45 |
| 5,814,897 A | * | 9/1998 | Ito et al. .................... 307/10.1 |
| 5,890,084 A | | 3/1999 | Halasz et al. |
| 5,961,562 A | * | 10/1999 | Iyoda ......................... 701/45 |
| 6,186,539 B1 | * | 2/2001 | Foo et al. .................... 280/735 |
| 6,529,810 B2 | * | 3/2003 | Foo et al. ...................... 701/45 |
| 6,776,435 B2 | * | 8/2004 | Foo et al. .................... 280/735 |
| 6,784,379 B2 | * | 8/2004 | Breed et al. ................. 177/144 |
| 6,833,516 B2 | * | 12/2004 | Breed et al. ................. 177/144 |

FOREIGN PATENT DOCUMENTS

| | | |
|---|---|---|
| DE | 29521450 | 12/1995 |
| JP | 3-231053 | 10/1991 |
| JP | 3-246139 | 11/1991 |
| JP | 6-55994 | 3/1994 |
| JP | 9-240416 | 9/1997 |
| JP | 9-240418 | 9/1997 |
| JP | 2001-505151 | 4/2001 |

* cited by examiner

Primary Examiner—Paul N. Dickson
Assistant Examiner—Toan C. To
(74) Attorney, Agent, or Firm—Posz Law Group, PLC

(57) ABSTRACT

An apparatus for driving an occupant-protecting airbag device mounted on a vehicle is provided. The airbag device includes an airbag and a squib and the squib can be deployed by igniting the squib. The apparatus comprise plural sensors, plural A/D converters, a determination unit and an ignition circuit. Each sensor senses a physical quantity acting on the vehicle to output an analog signal indicative of the physical quantity. Each of the plural A/D converters is electrically connected to at least one of the plurality of sensors to cause each A/D converter to perform an A/D conversion on the signal. The determination unit uses the signal converted by each A/D converter to determine whether or not the airbag should be deployed. The ignition circuit causes the squib to ignite to deploy the airbag when the determination unit determines that the airbag should be deployed.

20 Claims, 2 Drawing Sheets

APPARATUS FOR DRIVING ON-VEHICLE OCCUPANT-PROTECTING AIRBAG DEVICE

BACKGROUND OF THE INVENTION

1. Technical Field

The present invention relates to an apparatus for driving an occupant-protecting airbag device mounted on a vehicle.

2. Related Art

At present, a variety of types of on-vehicle occupant-protecting airbag systems have been known. Of these, one type of on-vehicle occupant-protecting airbag system is proposed by a patent publication No. 2001-505151.

This system is provided with an ignition circuit, a plurality of acceleration sensors, a single A/D converter, and a logic circuit. Each of the acceleration sensors is in charge of not only sensing various types of acceleration acting on an automobile but also generating analog electrical signals, each indicative of an amount of each type of acceleration. The A/D converter is placed to convert the analog electrical signals detected from the acceleration sensors into corresponding digital electrical signals. The logic circuit generates control signals to drive the ignition circuit in response to the A/D-converted digital detection signals.

The on-vehicle airbag system should be deployed in an emergency, but should not be easily deployed when the vehicle is in a normal state. To prevent the airbag from being deployed in the normal state, the airbag system is usually provided with devices for the prevention. One of such devices is a circuit that allows an airbag to be inflated only when all of a plurality of acceleration sensors installed in the system sense accelerations and generates ON signals.

However, the conventional on-vehicle airbag system has only one A/D converter as exemplified by the foregoing reference, there is a fear that use of such a single A/D converter invites undesirable situations. That is, when the single A/D converter operates erroneously due to such a disorder or some other malfunction, such a fear may be unfortunately realized.

SUMMARY OF THE INVENTION

The present invention has been made with due consideration to the foregoing difficulties, and an object of the present invention is to provide an on-vehicle airbag driving apparatus that is highly reliable against disorders of an A/D converting circuit, thus preventing erroneous operations of the airbag mounted on a vehicle.

In order to accomplish the foregoing object, as a first aspect of the present invention, there is provided an apparatus for driving an occupant-protecting airbag device mounted on a vehicle, the airbag device including an airbag and a squib and the squib being deployed by igniting the squib. The apparatus comprises a plurality of sensors, a plurality of A/D converters, a determination unit, and an ignition circuit. The plurality of sensors each sense a physical quantity acting on the vehicle to output an analog signal indicative of the physical quantity. The plurality of A/D (analog to digital) converters, each electrically connected to at least one of the plurality of sensors, cause each A/D converter to perform an A/D conversion on the signal, respectively. The determination unit uses the signal converted by each of the A/D converters to determine whether or not the airbag should be deployed. The ignition circuit causes the squib to ignite to deploy the airbag when the determination unit determines that the airbag should be deployed.

Preferably, the plurality of sensors and the number of A/D converters are the same in number. In this configuration, an output of each of the plurality of sensors is electrically connected to an input of each of the plurality of A/D converters.

It is also preferred that, output terminals of the plurality of sensors are electrically connected, in parallel to each other, to the determination unit through a plurality of transmission lines and each of the plurality of A/D converters is connected to each of the plurality of transmission lines to intervene between each sensor and the determination unit.

As a second aspect of the present invention, there is also provided an apparatus for driving an occupant-protecting airbag device mounted on a vehicle. The airbag device includes an airbag and a squib and the squib is deployed by igniting the squib. In this apparatus, pluralities of sensors each sense a physical quantity acting on the vehicle to output an analog signal indicative of the physical quantity. Further, a plurality of A/D (analog to digital) converters each receive, in parallel to each other, the signal outputted from at least one of the plurality of sensors and each performs an A/D conversion on the received signal. Also provided is a microcomputer which receives the signal converted by the A/D converters to control the ignition of the squib based on the received signal from each of the plurality of A/D converters.

As described above, the first and second aspects of the present invention have the feature of providing a plurality of A/D converters each receiving, in parallel to each other, the signal outputted from at least one of a plurality of sensors. This can be exemplified as a connecting configuration between two A/D converters and two sensors.

In this case, for example, one sensor can be electrically connected to one A/D converter, while the other sensor can be electrically connected to the other A/D converter. Another example can be provided such that both the sensors are electrically connected to one A/D converter, while one of the sensors is electrically connected to the other A/D converter. Still another example is that both the sensors are electrically connected to each of the A/D converters.

In other words, a plurality of A/D converters are arranged to receive, in parallel to each other, a signal outputted from one or more sensors. Thus, even if any A/D converter fails to operate properly, the airbag can be prevented from being inflated erroneously, as long as the remaining one or more A/D converters are in order in their operations.

In addition, the connection that each sensor is electrically connected to each A/D converter in a one-to-one correspondence is more advantageous than the wiring requiring one or more sensors to be connected to one A/D converter, in that the wiring between the sensors and the A/D converters can be simplified, thus making it possible to determine the ignition timing more accurately.

As a third aspect of the present invention, there is also provided an apparatus for driving an occupant-protecting airbag device mounted on a vehicle, the airbag device including an airbag and a squib and the squib being deployed by igniting the squib. In the apparatus, a plurality of sensors each senses a physical quantity acting on the vehicle to output an analog signal indicative of the physical quantity. A comparator makes a comparison between at least one of the signals outputted from the plurality of sensors and a reference signal so that a digital signal corresponding to the at least one signal is produced, and a digital-signal input port receives the digital signal produced by the comparator. An A/D (analog to digital) converter receives the signal outputted from at least one of the plurality of sensors to cause the A/D converter to perform an A/D conversion on the signal.

Further, a determination unit uses both of the signal converted by the A/D converter and the digital signal received by the digital-signal input port to determine whether or not the airbag should be deployed, and an ignition circuit causes the squib to ignite to deploy the airbag when the determination unit determines that the airbag should be deployed.

Hence, exemplified is a configuration in which two sensors, one digital signal input port, and one A/D converter are provided. In this case, one sensor can be electrically connected to one A/D converter, while the other sensor can be electrically connected to the digital signal input port via the comparator. Another example can be provided such that both the sensors are electrically connected to the A/D converter, while one of the sensors is electrically connected to the digital signal input port via the comparator. Still another example is that both the sensors are electrically connected to each of the A/D converter and the digital signal input port.

Such configurations allow the determination circuit to receive a digital sensor-output signal coming through the comparator and a digital sensor-output signal subjected to the A/D conversion at the A/D converter. Even when the A/D converter breaks down, an erroneous deployment of the airbag can be avoided, provided that the digital sensor-output signal coming via the comparator is normal. On the other hand, a disorder of the comparator can be backed up by the digital sensor-output signal from the A/D converter, provided that the A/D converter operates normally.

In addition, the connection that each sensor is electrically connected to each of the A/D converter and the comparator in a one-to-one correspondence is more advantageous than the wiring requiring one or more sensors to be connected to one A/D converter or one comparator, in that the wiring between the sensors and the A/D converter and comparator can be simplified, thus making it possible to determine the ignition timing more accurately.

Preferably, the digital signal produced by the comparator in an ON/OFF signal consists of high level signals and low level signals. For example, when an output signal from a sensor is larger in an analog value than the reference signal value, an ON signal is made, while the case opposite to this leads to producing an OFF signal. The comparator can be made simpler than the A/D converter, so that the driving apparatus is made compact as a whole and advantageous in production cost.

Still preferably, the comparator may be placed to receive the signals outputted from a part of the plurality of sensors and the A/D converter may be placed to receive the signal outputted from any of the remaining sensors.

BRIEF DESCRIPTION OF THE DRAWINGS

Other objects and aspects of the present invention will become apparent from the following description and embodiments with reference to the accompanying drawings in which.

DETAILED DESCRIPTION OF PREFERRED EMBODIMENTS

Referring to the accompanying drawings, preferred embodiments of the present invention will now be described. (First embodiment)

Refereeing to FIG. 1, a first embodiment of an airbag driving apparatus according to the present embodiment will now be described. This airbag driving apparatus is reduced into practice as part of an on-vehicle occupant-protecting airbag system provided with an airbag device.

Figure 1:
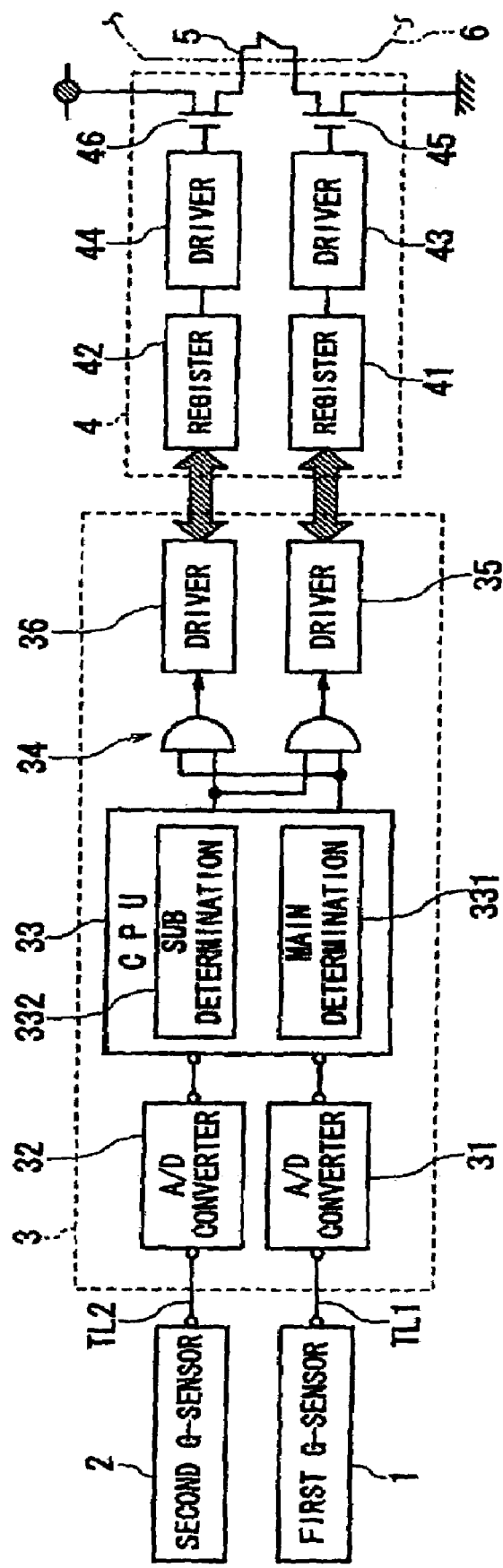
FIG. 1 is a block diagram showing the entire configuration of an airbag driving apparatus according to a first embodiment of the present invention.

The airbag driving apparatus according to the first embodiment is schematically shown in FIG. 1. As shown, the airbag driving apparatus, which is also mounted on a vehicle and constituted as an airbag ECU (electronic control unit), is provided with a first acceleration sensor 1, a second acceleration sensor 2, a microcomputer 3, and an integrating IC (serving as an ignition circuit) 4. Though not shown in FIG. 1, the airbag ECU is disposed in the central part of a vehicle.

Each of the first and second sensors 1 and 2 is configured as an electronic type of physical quantity sensor detecting an acceleration acting on the vehicle in the form of an electronic analog-amount signal. This signal depends on displacement amounts of the vehicle. Both the first and second sensors 1 and 2 are the same in their constructions. Incidentally, in the present embodiment, the acceleration is handled as one type of physical quantity.

The microcomputer 3 is provided with two A/D converters 31 and 32, a CPU33, an AND circuit 34, and two drivers 35 and 36. Of these components, the A/D converter 31 is electrically coupled to the first acceleration sensor 1 by a first transmission line TL1 in order to receive a signal outputted from the first acceleration sensor 1. Hence a detected acceleration signal is digitized into a corresponding digital acceleration signal by the A/D converter 31. Like this connection, the remaining A/D converter 32 is electrically coupled to the second acceleration sensor 2 by a second transmission line TL2 in order to receive a signal outputted from the second acceleration sensor 2. Hence a detected acceleration signal is digitized into a corresponding digital acceleration signal by the A/D converter 32. The digitized acceleration signals at both the A/D converters 31 and 32 are then sent to the CPU 33, respectively.

The CPU 33 operates on a predetermined algorithm by sequentially executing the procedures written in a program, which is stored in a not-shown internal or external memory. Through execution of the procedures, the CPU 33 is able to function as a main determination unit 331 and a sub determination unit 332. Both the main and sub determination units 331 and 332 are classified depending on a degree of complexity of processing given thereto.

The digital detection signal from the first A/D converter 31 is thus sent to the main determination unit (i.e., CPU 33), so that the detection signal from the first acceleration sensor 1 is sent to the main determination unit 331 in the form of a digital signal. Hence the detection signal outputted from the first acceleration sensor 1 is subjected to the processing carried out by the main determination unit 331 (i.e., the CPU 33), the processing being whether or not an on-vehicle airbag for safety should be deployed. To be specific, the processing is for determining that switches 45 and 46 (later described) of the consolidated IC 4 should take which of ON/OFF statuses.

Furthermore, the digital detection signal from the second A/D converter 32 is thus sent to the sub determination unit 332 (i.e., CPU 33), so that the detection signal from the second acceleration sensor 2 is sent to the sub determination unit 332 in the form of a digital signal. Hence the detection signal outputted from the second acceleration sensor 2 is subjected to the processing carried out by the sub determination unit 332 (i.e., the CPU 33), the processing being whether or not the on-vehicle airbag should be deployed.

The drivers 35 and 36 receives, through the AND circuit 34, signals indicating results determined by the CPU 33, and supply the consolidated IC 4 with the signals. The AND circuit 34 consists of two AND gates each having not only two input terminals that respectively receive outputs from the CPU 33 but also one output terminal connected to each of the drivers 35 and 36. That is, the two input terminals of each AND gate are configured to receive the output signals indicative of a result performed by both of the main and sub determination units 331 and 332 functionally established by the CPU 33. Hence, only when the output signals from both of the main and sub determination units 331 and 332 are ON-states at the same time, each of the drivers 35 and 36 receives an ON-determined signal through the AND circuit 34.

The consolidated IC 4 is provided with two registers 41 and 42, two igniting drivers 43 and 44, a potentially low-side switch 45, and a potentially high-side switch 46. Of the two registers 41 and 42, one register 41 is connected to one (35) of the drivers 35 and 36 to memorize data coming from the driver 35. Like this, the other register 42 is connected to the other driver 36 to memorize data coming from the driver 36.

In this consolidated IC 4, each of the igniting drivers 43 and 44 has an input terminal and an output terminal. The input terminal of each igniting driver 43 (44) is connected to an output terminal of each of the registers 41 and 42, while the output terminal of each igniting driver 43 (44) is connected to an output terminal of each of the potentially low-side and high-side switches 45 and 46. The switches 45 and 46 are composed of FETs, respectively.

Using data stored in one "41" of the registers 41 and 42, the igniting driver 43 generates an analog-amount driving signal, which is then given to a gate of the low-side switch 45. This switch 45 operates ON/OFF in response to states of the driving signal. This is also true of the high-side switch 46. Namely, using data stored in the other register 42, the igniting driver 44 generates an analog-quantity driving signal, which is then given to a gate of the high-side switch 46. This switch 46 operates ON/OFF in response to states of the driving signal coming from the driver 44.

Both of the low-side and high-side switches 45 and 46 are connected in series to a squib 5 consisting of part of an on-vehicle airbag device. The airbag device has an inflatable airbag 6 to be deployed in response to an ignition of the squib 5. A battery (not shown) and a backup power supply (not shown), which both are mounted on this vehicle, are placed as power supply sources to the squib 5. Specifically, one of both terminals of the squib 5 is electrically coupled with both the battery and the backup power supply through the high-side switch 46, whilst the other end thereof is electrically grounded through the low-side switch 45.

The backup power supply, of which main component is a capacitor, is prepared for an emergency case in which the on-vehicle battery is out of order or unable to supply power due to, for example, a vehicle collision. In such an emergency case, the backup power supply supplies power to the squib 5. In order to cope with this, the voltage from the battery is pressurized to be stored in the capacitor essentially functioning as the backup power supply.

In this system configuration, therefore, in cases where both of the high-side switch 46 and the low-side switch 45 are turned ON, the power is immediately supplied to the squib 5 from the vehicle's battery or vehicle's backup power source, so that the airbag is deployed in a moment of time.

As described above, the present airbag driving apparatus is formed to have the two A/D converters 31 and 32 each being disposed between the first or second acceleration sensor 1 or 2 and the CPU 33. It is therefore possible that, even when one of the two A/D converters 31 and 32 gets out of order to output a signal erroneously, the microcomputer 3 is prevented, without fail, from outputting an ON-determined signal, as long as the remaining A/D converter is normal. As a result, the possibility that a disorder of one of the A/D converters 31 and 32 may lead to a malfunction (i.e., deploying operation) of the airbag can be avoided with steadiness.

Various modifications can be reduced into practice, not limited to the configuration described above.

For example, in the foregoing configuration in which the A/D converters and the acceleration sensors are two in number, respectively, both the sensors may be electrically connected to one A/D converter and one of the sensors is electrically connected to the other A/D converter. Alternatively, both the sensors may be electrically connected to each of the A/D converters.

Furthermore, the number of sensors (physical quantity sensors) is not limited to two, but three or more sensors may be disposed depending on the number of required physical quantities for controlling deployment of the airbag (in this case, the number of A/D converters is still two or more).

(Second Embodiment)

Figure 2:
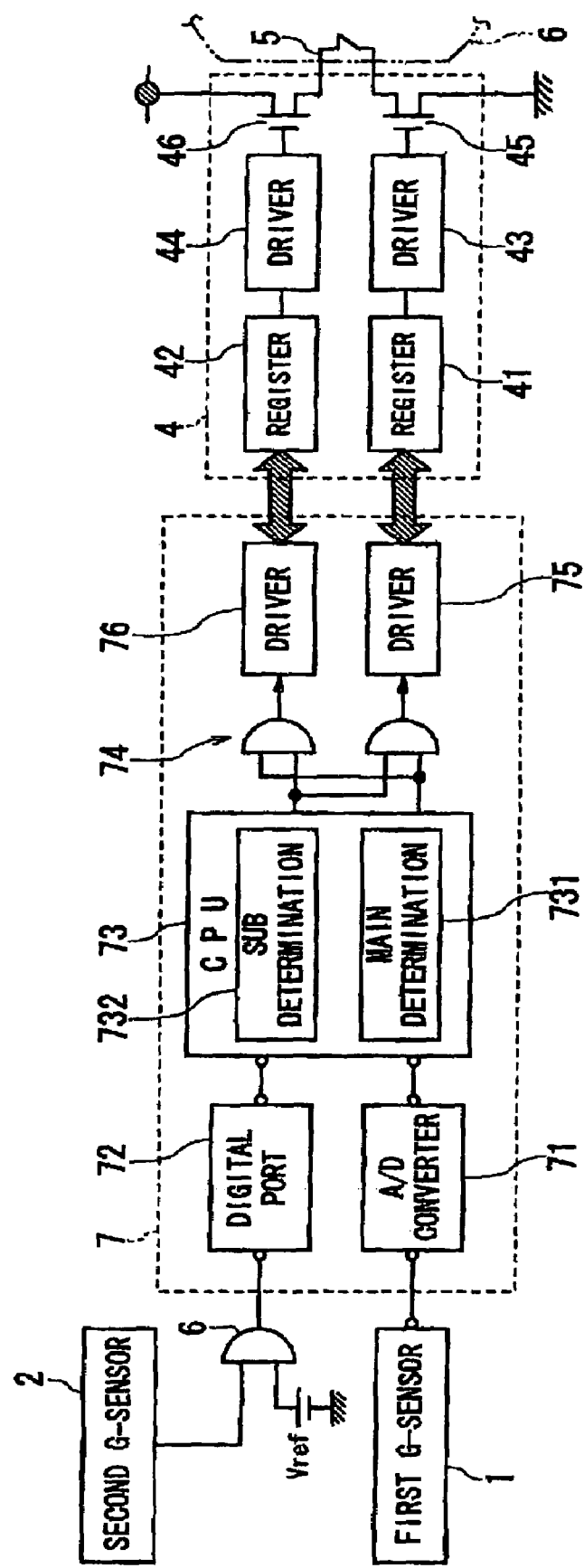
FIG. 2 is a block diagram showing the entire configuration of an airbag driving apparatus according to a second embodiment of the present invention.

Referring to FIG. 2, an airbag driving apparatus according to a second embodiment of the present invention will now be described. In the present invention, for the sake of simplified explanations, the similar or identical components to those in the first embodiment will be referred by the same reference numerals as those in the first embodiment.

The airbag driving apparatus according to the second embodiment exemplifies another configuration of the A/D conversion performed on detected signals from the sensors mounted on a vehicle.

As shown in FIG. 2, the airbag driving apparatus is provided with a comparator (comparing circuit) 6 and a microcomputer 7 as well as the first acceleration sensor 1, the second acceleration sensor 2, and the integrating IC (ignition circuit) 4 which have already been described in the first embodiment. In the same manner as the first embodiment, this airbag driving apparatus is constituted as an airbag ECU (electronic control unit) and disposed in an approximately central part of the vehicle.

The comparator 6 is disposed between the second acceleration sensor 2 and the microcomputer 7 in such a manner that an output signal from the second acceleration sensor 2 is compared with a reference signal Vref to output a high-level signal or a low-level signal in a digital-amount manner. Practically, the comparator 6 has two input terminals, where one terminal is connected to the output terminal of the second acceleration sensor 2 and the other is connected to a terminal to which a constant specified voltage (Vref) is applied. Hence if an output of the second acceleration sensor 2 is larger than the reference signal Vref, the high-level signal is outputted from the comparator 6. If the opposite largeness relationship exists between the sensor output and the reference signal Vref, the low-level signal is outputted from the comparator 6.

As shown in FIG. 2, the microcomputer 7 is provided with a single A/D converter 71, a digital-signal input port 72, a CPU 73 serving as a determination unit, an AND circuit 74, and microcomputer-use drivers 75 and 76.

Of these components, the A/D converter 71 is placed between the first acceleration sensor 1 and the CPU 73. Hence a detected acceleration signal by the first acceleration sensor 1 is A/D-converted by the A/D converter 71, so that the digital-amount detected acceleration signal is then sent to the CPU 73, as described in the first embodiment.

The digital-signal input port 72 is placed between the comparator 6 and the CPU 73. Hence, in the digital-signal input port 72, a digital compared signal composed of the high-level and low-level signals produced by the comparator 6 is inputted and stored. Those compared digital signals are then supplied to the CPU 73 from the port 72.

The comparator 6 is made considerably simpler in constructions than A/D converters. In addition, compared to the output signal from the A/D converter, the output signal from the comparator 6 is made simpler, because the output signal is composed of only high and low signals.

Like the CPU 33 described in the first embodiment, the CPU 73 operates on a predetermine algorithm so that the CPU 73 is able to function as a main determination unit 731 and a sub determination unit 732. Both the main and sub determination units 731 and 732 are classified depending on a degree in complexity of processing given thereto.

The digital detection signal from the A/D converter 71 is thus sent to the main determination unit (i.e., CPU 33), so that the digital-amount detection signal from the first acceleration sensor 1 is sent to the main determination unit 731. Hence the detection signal outputted from the first acceleration sensor 1 is subjected to the processing carried out by the main determination unit 331, the processing being whether or not an on-vehicle airbag for safety should be deployed. To be specific, the processing is for determining that the switches 45 and 46 of the consolidated IC 4 should take which of ON/OFF statuses.

On the other hand, the digital compared signal from the digital-signal input port 72 is sent to the sub determination unit 732 (i.e., CPU 33), so that the digital-amount detected signal from the second acceleration sensor 2 is sent to the sub determination unit 732. Hence the detection signal outputted from the second acceleration sensor 2 is subjected to the processing carried out by the sub determination unit 731, the processing also being whether or not the on-vehicle airbag should be deployed. The digital detection signal to the sub determination unit 732 is made up of only high-level signals and low-level signals, facilitating the calculation for the processing.

The AND circuit 74 is inserted between the CPU 73 and the microcomputer-use drivers 75 and 76, and an output signal resulting from the determination by the CPU 73 is routed to the consolidated IC 4 via the AND circuit 4. It is therefore possible that an ON signal is sent to the both the microcomputer-use drivers 75 and 76 only when both the output signals from the main determination unit 731 and the sub determination unit 732 are ON states.

The configurations and operations of the first and second acceleration sensors 1 and 2 and the consolidated IC 4 are similar or identical to those in the first embodiment.

As described above, one of the acceleration sensors 1 and 2 is electrically connected to the A/D converter 71 and the other sensor is electrically connected to the digital signal input port 72 by way of the comparator 6. Thus, if the A/D converter 71 fails to operate normally so that an erroneous signal outputted therefrom, the microcomputer 7 is surely prevented from outputting an ON signal to drive the airbag 6, as long as the comparator 6 and the digital signal input port 72 both are normal. By contrast, a malfunction at the comparator 6 and/or digital signal input port 72 is backed up by the A/D converter 6, as long as the A/D converter 6 does not break down together with the comparator 6 and/or port 72. This backup operation prevents the airbag from being inflated erroneously due to a malfunction at the A/D converting configuration.

In the second embodiment, various modifications can also be reduced into practice, not limited to the configuration described above.

For example, in the foregoing configuration in which the A/D converting units (i.e., the A/D converter and a combination of the comparator and the port) and the acceleration sensors are two in number, respectively, both the sensors may be electrically connected to one A/D converting unit and one of the sensors is electrically connected to the other A/D converting unit. Alternatively, both the sensors may be electrically connected to each of the A/D converting units.

Furthermore, the number of sensors (physical quantity sensors) is not limited to two, but three or more sensors may be disposed depending on the number of required physical quantities for controlling deployment of the airbag (in this case, the number of A/D converting units is still two or more).

Though the foregoing embodiments have been described about the physical quantity sensor sensing the physical quantity acting on a vehicle, the physical quantity sensor according to the present invention is not limited to such a sensor. The physical quantity sensors which can be adopted by the present invention include a collision sensor sensing information indicative of a vehicle's collision and a rolling sensor sensing information indicative of a vehicle's roll. The collision sensor includes an acceleration sensor detecting an acceleration acting on the vehicle, as described above, and a mechanical censor that turns on and off depending on the vehicle's operations. On the other hand, the rolling sensor is for example a roll rate sensor detecting a roll rate of the vehicle. As long as the sensor detects an analog signal for determining whether or not the squib resistor of the airbag device should be ignited, such a sensor can be adopted by the present invention.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

The entire disclosure of Japanese Patent Application No. 2003-37286 filed on Feb. 14, 2003 including the specification, claims, drawings and summary is incorporated herein by reference in its entirety.

What is claimed is:

1. An apparatus for driving an occupant-protecting airbag device mounted on a vehicle, the airbag device including an airbag and a squib to which power is supplied, the squib being deployed by igniting the squib, the apparatus comprising:

a plurality of sensors each sensing a physical quantity acting on the vehicle and outputting analog signal indicative of the physical quantity;

a comparator placed to directly receive at least one of the analog signals, the comparator configured to make a comparison between the at least one of the analog signals and a reference signal given to the comparator to produce a digital signal corresponding to the at least one of the analog signals a digital-signal input port configured to receive the digital signal produced by the comparator;

an A/D (analog to digital) converter receiving the analog signal outputted from at least one of the plurality of sensors to cause the A/D converter to perform an A/D conversion on the analog signal to produce another digital signal;

a determination unit configured to use both the another digital signal produced by the A/D converter and the digital signal received by the digital-signal input port to determine whether or not the airbag should be deployed; and an ignition circuit configured to cause the squib to be ignited to deploy the airbag when the determination unit determines that the airbag should be deployed.

2. The apparatus according to claim 1, wherein the digital signal produced by the comparator is an ON/OFF signal comprising high level signals and low level signals.

3. The apparatus according to claim 1, wherein the comparator is placed to receive one or more analog signals outputted from a part of the plurality of sensors and the A/D converter is placed to receive one or more analog signals outputted from a remaining of the plurality of sensors.

4. The apparatus according to claim 1, wherein the plurality of sensors sense acceleration as the physical quantity.

5. The apparatus according to claim 4, wherein the plurality of sensors are two in number and the comparator is a single comparator placed to directly receive one of the analog signals outputted from the two sensors.

6. The apparatus according to claim 5, wherein the digital-signal input port, the A/D converter and the determination unit are incorporated in a microcomputer, wherein the microcomputer is coupled to the ignition circuit by two mutually separated transmission lines, wherein each of the two mutually separated transmission lines transmits a signal to ignite the squib from the determination unit.

7. The apparatus according to claim 6, wherein the squib is one in number, wherein the ignition circuit includes two igniting devices, wherein each of the two igniting devices receives the signal to ignite the squib from the determination unit through each of the two mutually separated transmission lines, wherein each of the two igniting devices ignites the squib in response to the received signal.

8. The apparatus according to claim 7, wherein the determination unit includes two determination components, wherein each of the two determination components performs the determination, wherein each of the two determination components is configured to provide the signal to ignite the squib to each of the igniting devices through each of the two mutually separated transmission lines.

9. The apparatus according to claim 8, wherein a first determination component of the two determination components responds to the another digital signal produced by the A/D converter and a second determination component of the two determination components responds to the digital signal outputted by the comparator, wherein the signals to ignite the squib from both the first and second determination components are provided to the two igniting devices in parallel with each other.

10. The apparatus according to claim 1, wherein the plurality of sensors are two in number and the comparator is a single comparator placed to directly receive one of the analog signals outputted from the two sensors.

11. The apparatus according to claim 10, wherein the determination unit is coupled to the ignition circuit through two mutually separated transmission lines to transmit signals to ignite the squib.

12. The apparatus according to claim 11, wherein the squib is one in number, wherein the ignition circuit includes two igniting devices that receive the signals to ignite the squib respectively from the determination unit through the two mutually separated transmission lines, wherein each of the two igniting devices ignites the squib in response to the received signal to ignite the squib.

13. The apparatus according to claim 12, wherein the determination unit includes two determination components that each performs the determination, wherein each of the two determination components is configured to provide the signal to ignite the squib to each of the igniting devices through each of the two mutually separated transmission lines.

14. The apparatus according to claim 13, wherein a first determination component of the two determination components responds to the another digital signal produced by the A/D converter and a second determination component of the two determination components responds to the digital signal produced by the comparator, wherein the signals to ignite the squib from both the first and second determination components are provided to both the igniting devices in parallel with each other.

15. An apparatus for driving an occupant-protecting airbag device mounted on a vehicle, the airbag device including an airbag and a squib to which power is supplied and the squib being deployed by igniting the squib, the apparatus comprising:

a plurality of sensors each sensing a physical quantity acting on the vehicle and outputting an analog signal indicative of the physical quantity;

a comparator placed to directly receive at least one of the analog signals and configured to make a comparison between the at least one of the analog signals and a reference signal given to the comparator so that a digital signal corresponding to the at least one analog signal is produced;

a digital-signal input port configured to receive the digital signal produced by the comparator;

an A/D (analog to digital) converter receiving the analog signal outputted from at least one of the plurality of sensors to cause the A/D converter to perform an A/D conversion on the signal to produce another digital signal;

determining means for using the another digital signal produced by the A/D converter and the digital signal received by the digital-signal input port to determine whether or not the airbag should be deployed; and igniting means for causing the squib to be ignited to deploy the airbag when the determination unit determines that the airbag should be deployed.

16. An apparatus for driving an occupant-protecting airbag device mounted on a vehicle, the airbag device including an airbag and a squib to which power is supplied, the squib being deployed by igniting the squib, the apparatus comprising:

a first sensor and a second sensor for sensing a physical quantity acting on the vehicle, the first sensor and the second sensor respectively outputting first and second analog signals indicative of the physical quantity;

an analog to digital (A/D) converter configured to receive the first analog signal outputted from first sensor and produce a first digital signal corresponding to the first analog signal;

a comparator disposed to directly receive the second analog signal outputted by the second sensor, the comparator configured to make a comparison between the second analog signal and a reference signal and produce a second digital signal corresponding to the second analog signal;

a digital-signal input port configured to receive the second digital signal produced by the comparator;

a determination unit configured to determine whether or not the airbag should be deployed based upon both the first digital signal and the second digital signal; and an ignition circuit configured to cause the squib to be ignited to deploy the airbag when the determination unit determines that the airbag should be deployed.

17. The apparatus according to claim 16, wherein the second digital signal produced by the comparator is an ON/OFF signal comprising high level signals and low level signals.

18. The apparatus according to claim 16, wherein the digital-signal input port, the A/D converter and the determination unit are incorporated in a microcomputer, wherein the microcomputer is coupled to the ignition circuit by two mutually separated transmission lines, wherein each of the two mutually separated transmission lines transmits a signal to ignite the squib from the determination unit.

19. The apparatus according to claim 16, wherein the determination unit includes two determination components, wherein each of the two determination components performs the determination, wherein the two determination components are respectively coupled to the ignition circuit by two mutually separated transmission lines, wherein each of the two determination components is configured to provide a signal to ignite to the ignition circuit through each of the two mutually separated transmission lines.

20. The apparatus according to claim 19, wherein a first determination component of the two determination components responds to the first digital signal produced by the A/D converter and a second determination component of the two determination components responds to the second digital signal produced by the comparator, wherein the signals to ignite from both the first and second determination components are provided to the ignition circuit in parallel.

* * * * *